UNITED STATES PATENT OFFICE.

FRANÇOIS COIGNET, OF PARIS, FRANCE, ASSIGNOR TO L. MANGEON, OF NEW YORK CITY.

IMPROVED PROCESS OF FORMING ARTIFICIAL STONE.

Specification forming part of Letters Patent No. 88,549, dated April 6, 1869.

*To all whom it may concern:*

Be it known that I, FRANÇOIS COIGNET, of the city of Paris, in the department of the Seine and Empire of France, have invented certain Improvements in the Manufacture of Artificial Stones; and I do hereby declare that the following is a full and exact description thereof, which will enable others skilled in the art to make and use the same.

This invention relates to the manufacture of artificial stones, or monolithic structures, made by the agglomeration of hydraulic lime, hydraulic cement, and sand, properly prepared in the state which I have established and specified, several times, as pulverulent paste or plastic powder, and called artificial-stone paste; and the present invention consists in the use of heat, or the application of heat, as hereafter specified, and for the purpose further explained.

I have found, by repeated experiments, that when lime, hydraulic lime, sand, and, in some cases, hydraulic cements, are to be used for the confection of artificial stones, if these substances are previously heated to a proper degree; if hot water is employed for the preparation; if the mill in which the trituration of the substances is effected is heated either by the application of artificial heat, directly to the casing of the mill, by worms or otherwise, or if live steam is introduced into and through the substances undergoing trituration; I have found, as I have remarked, that in that case the pulverulent paste which I obtain possesses, to an extraordinary degree, the power of setting quickly and firmly—in short, of becoming quite hard as soon as it is agglomerated. This affords the greatest advantage for any piece of work that has to be exposed to frost a short time after it is made, and for all hydraulic works of art, and it allows, of course, the constructions to be carried on all through winter, which otherwise would be interrupted by cold weather.

In carrying my invention into practice, the sand, the lime, and the cement may be first heated, individually, by any convenient method, either by air, steam, or contact with heated surfaces. The mill may be heated by the direct action of fire thereon, or by having a steam-jacket or coiled pipe, and in some cases live steam may be injected into the mill during its action on the triturated substances—in any of these cases the result being the same—to bring up and maintain at a proper temperature the mass, so as to obtain a hot artificial-stone paste, ready for agglomeration in molds, by the method I have already described elsewhere.

What I claim, and desire to secure by Letters Patent, is—

1. The application of heat in the preparation of artificial-stone paste, either to the materials employed before being mixed, or to the mixture of the same during the process of trituration, substantially in the manner and for the purpose set forth.

2. The manufacture of artificial stones, or monolithic structures, by means and with the use of hot agglomerated artificial-stone paste, substantially prepared as herein set forth.

FRANÇOIS COIGNET. [L. S.]

Witnesses:
EMILE BARRAULT,
17 Boulevard St. Martin.
S. BONARD,
Boulevard St. Martin, 17.